Dec. 7, 1943. H. MOSCHEL ET AL 2,336,117
SIDE DELIVERY RAKE
Filed June 10, 1940 6 Sheets-Sheet 2

INVENTORS:
HERMAN MOSCHEL
FRANK D. JONES
MARCUS E. McCLELLAN
VERMONT V. MAPPIN
BY
ATTORNEYS.

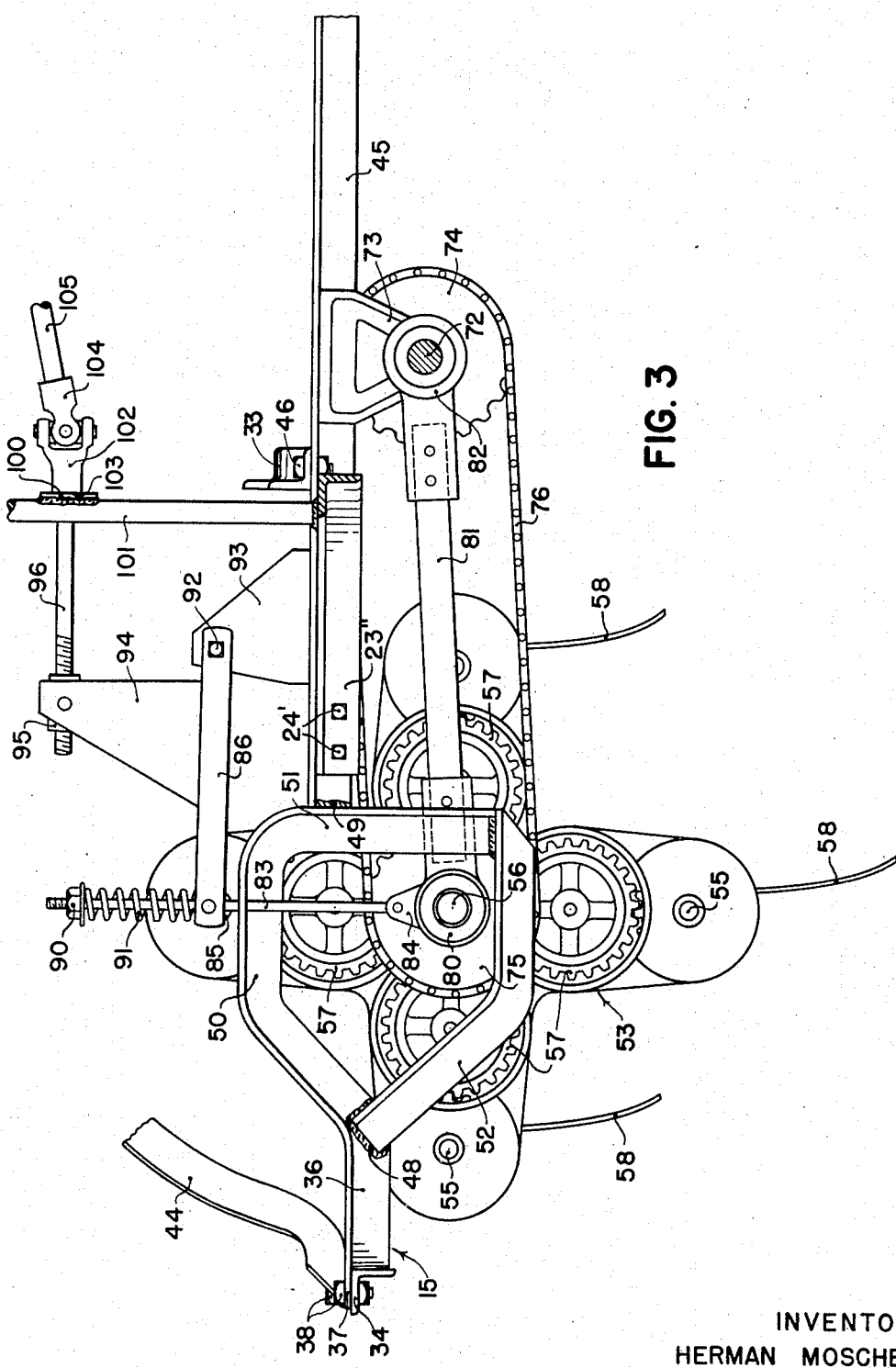

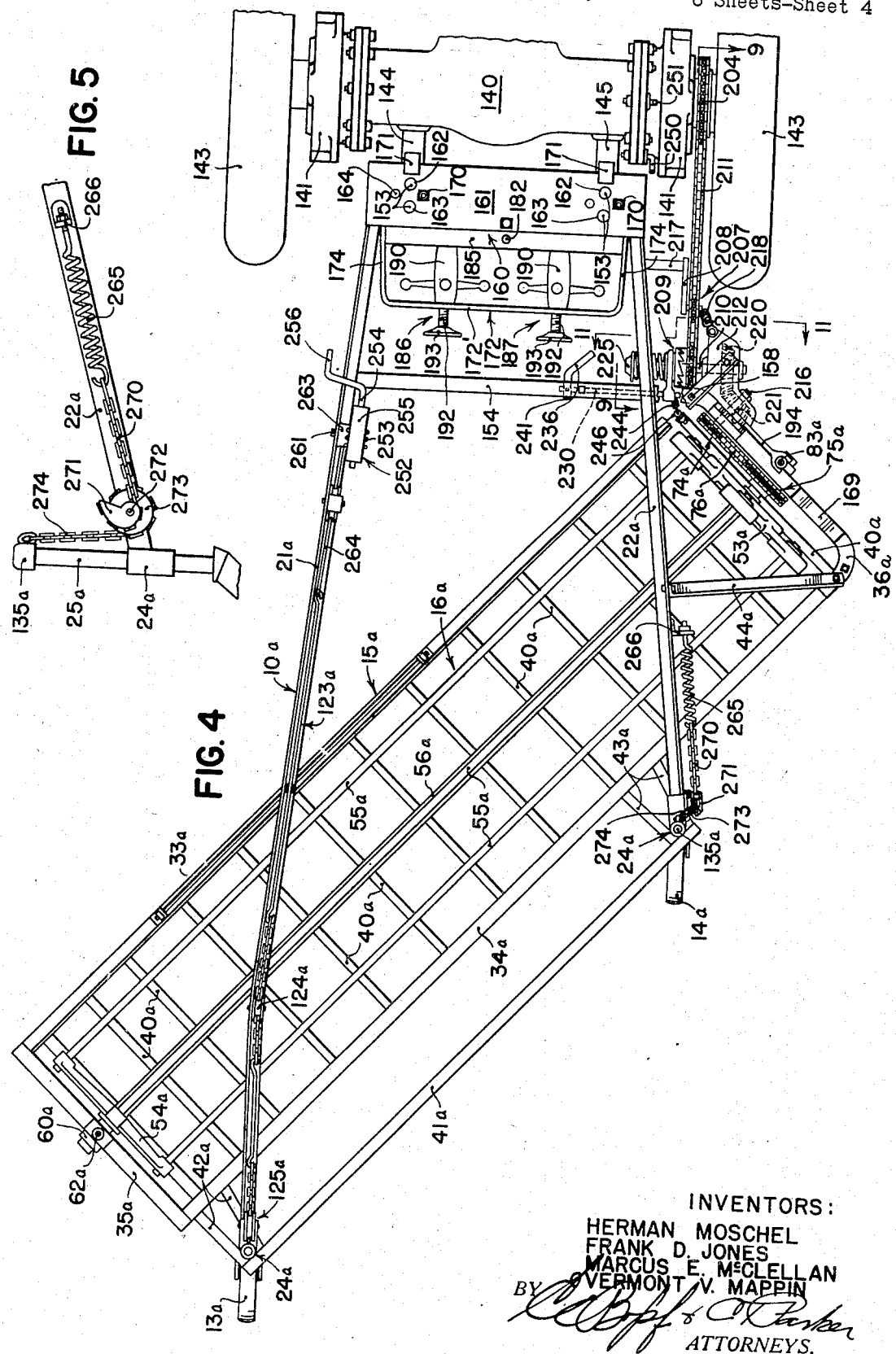

Dec. 7, 1943. H. MOSCHEL ET AL 2,336,117
SIDE DELIVERY RAKE
Filed June 10, 1940 6 Sheets-Sheet 5
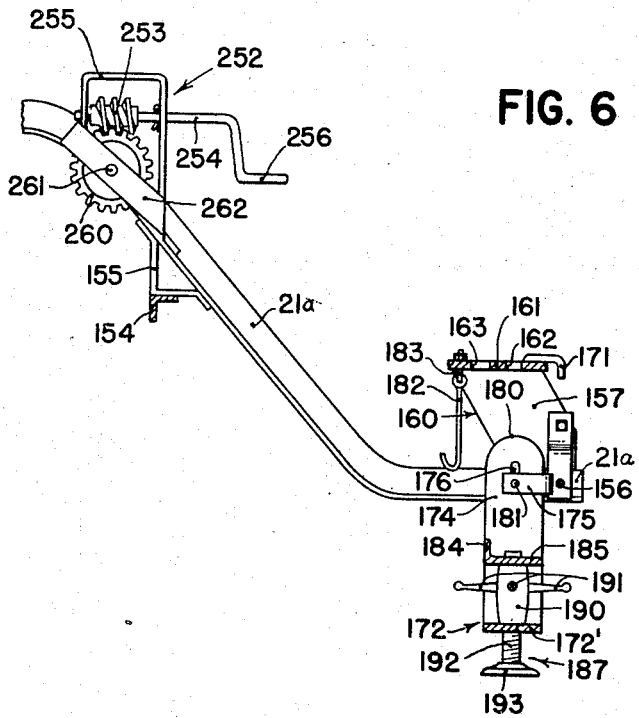
FIG. 6
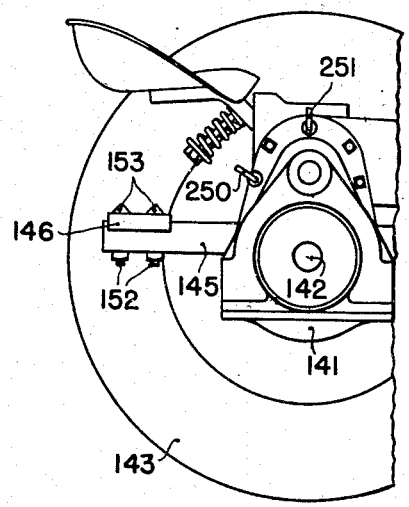
FIG. 7
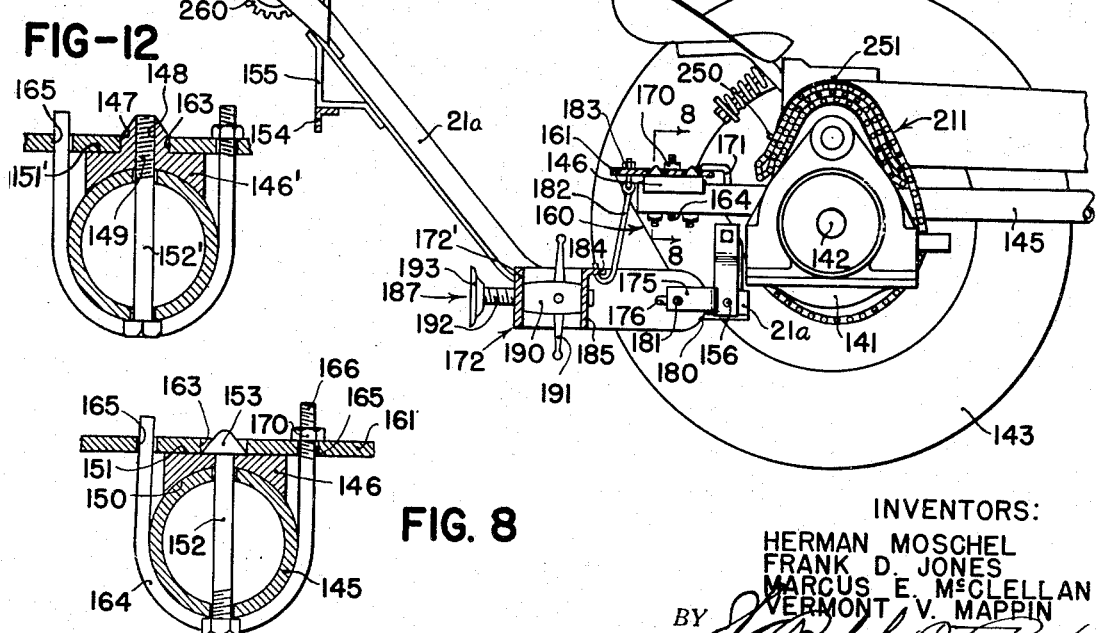
FIG-12
FIG. 8
INVENTORS:
HERMAN MOSCHEL
FRANK D. JONES
MARCUS E. McCLELLAN
VERMONT V. MAPPIN
BY
ATTORNEYS.

Dec. 7, 1943.   H. MOSCHEL ET AL   2,336,117
SIDE DELIVERY RAKE
Filed June 10, 1940   6 Sheets-Sheet 6
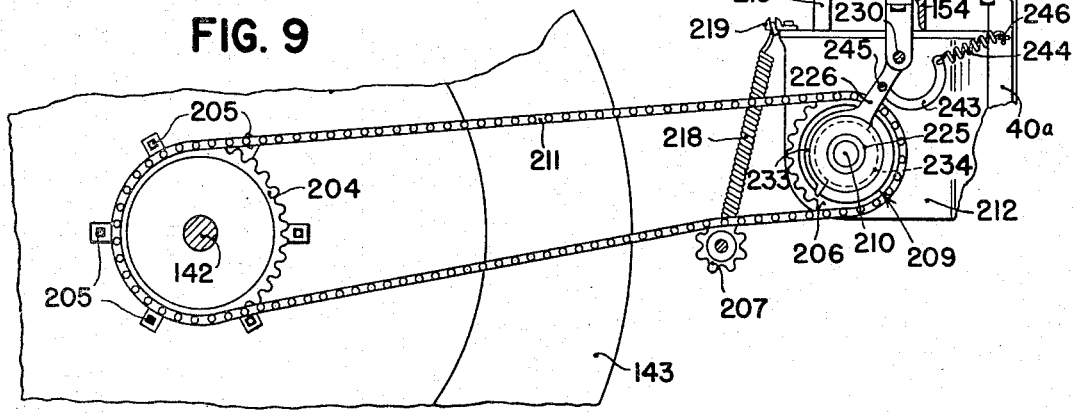
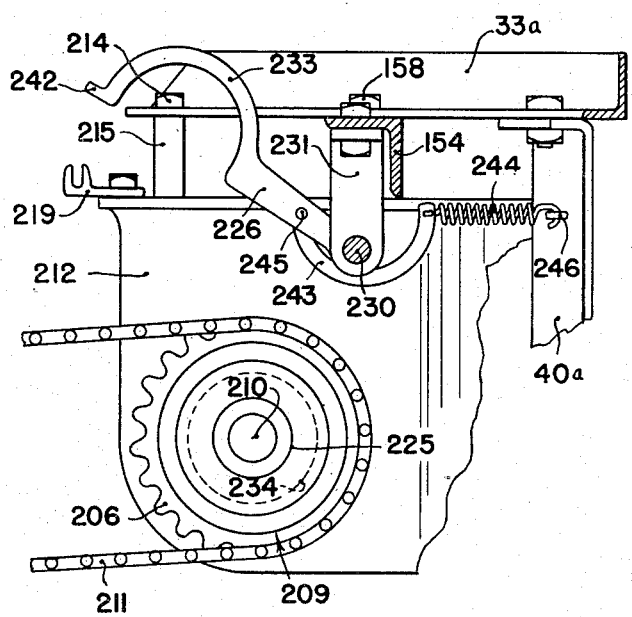
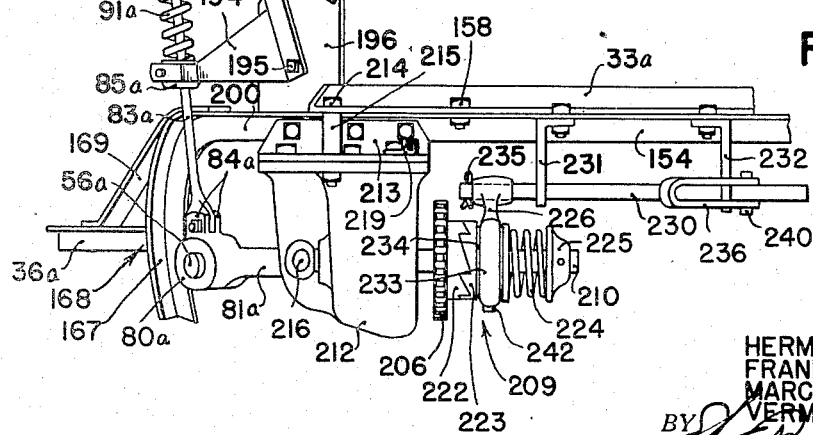
INVENTORS:
HERMAN MOSCHEL
FRANK D. JONES
MARCUS E. McCLELLAN
VERMONT V. MAPPIN
BY
ATTORNEYS.

Patented Dec. 7, 1943

2,336,117

UNITED STATES PATENT OFFICE 2,336,117

SIDE DELIVERY RAKE

Herman Moschel, Frank D. Jones, Vermont V. Mappin, and Marcus E. McClellan, Ottumwa, Iowa, assignors to Dain Manufacturing Company of Iowa, Ottumwa, Iowa, a corporation of Iowa Application June 10, 1940, Serial No. 339,670

25 Claims. (Cl. 56—377)

The present invention relates to agricultural implements and is more particularly concerned with that type of implement known as side delivery rakes. The primary object of our invention is to provide a new and improved rake embodying certain novel features which contribute to produce a rugged, highly efficient implement that is extremely flexible to meet a wide variety of operating conditions.

A more specific object of our invention is to provide a novel arrangement of the main frame, rake reel, and supporting wheels wherein the reel is enabled to rake the ground directly behind both of the front wheels. This is particularly advantageous when raking hay under conditions common to the check and border system of irrigation, which is widely used in certain semi-arid regions, as it allows the hay to be raked from the top of the border without damage to border or rake by running with the wheel on top of the border, and also permits working up close to the border by running with the wheel closely alongside the border.

A further object is to provide an improved frame construction which is strongly braced to withstand the severe twisting stresses to which side delivery rakes are frequently subjected and which, at the same time, provides ample clearance for handling the heaviest crop.

Another object is to provide an improved dual caster wheel suspension for the rear end of the rake wherein one of the wheels is adjustable vertically to raise or lower the frame with respect to the ground, while the other wheel is spring-controlled and is free to follow the surface of the ground, bearing its share of the load as field surface irregularities demand.

Still another object of the present invention is to provide an improved spring suspension and driving connection for the rake reel.

Another object is the provision, in a tractor mounted side delivery rake having a driven sprocket and a releasable clutch, of means for removing the reel driving chain bodily from the driven sprocket over the clutch to permit unhitching the rake from the tractor without disconnecting the chain. A related object is to provide means on the tractor for supporting the chain when the rake is unhitched.

A further object of our invention is the provision of a new and improved draft connection by means of which the rake can be quickly and easily coupled to or uncoupled from the tractor, and one of the features of this draft connection is a jack stand which can be swung up to a raised transport position on the rake frame.

These and other objects and advantages of the present invention will become apparent to those skilled in the art after consideration of the following detailed description of the embodiments thereof illustrated in the accompanying drawings.

In the drawings:

Figure 3 is an enlarged detail view of the spring suspension for the forward or inner end of the rake reel;

Figure 4 is a top plan view of a modified form of our invention, showing a tractor mounted side delivery rake;

Figure 5 is an enlarged detail view of the spring suspension for the right caster wheel;

Figure 6 is an enlarged fragmentary side view, partially in section, showing the rake unhitched from the tractor and resting on the jack stand, the near wheel of the tractor being removed;

Figure 7 is a view similar to Figure 6 but with the rake hitched to the tractor and the reel driving chain looped over brackets on the rear axle housing;

Figure 8 is an enlarged section taken along the line 8—8 in Figure 7;

Figure 9 is an enlarged sectional view taken along the line 9—9 in Figure 4;

Figure 10 is an enlarged end view of the reel drive clutch, showing the clutch fork raised to permit removal of the chain;

Figure 11 is a front view of the clutch and gearbox of the tractor mounted rake; and Figure 12 is a sectional view of a modified form of the coupling device shown in Figure 8.

Figure 1:
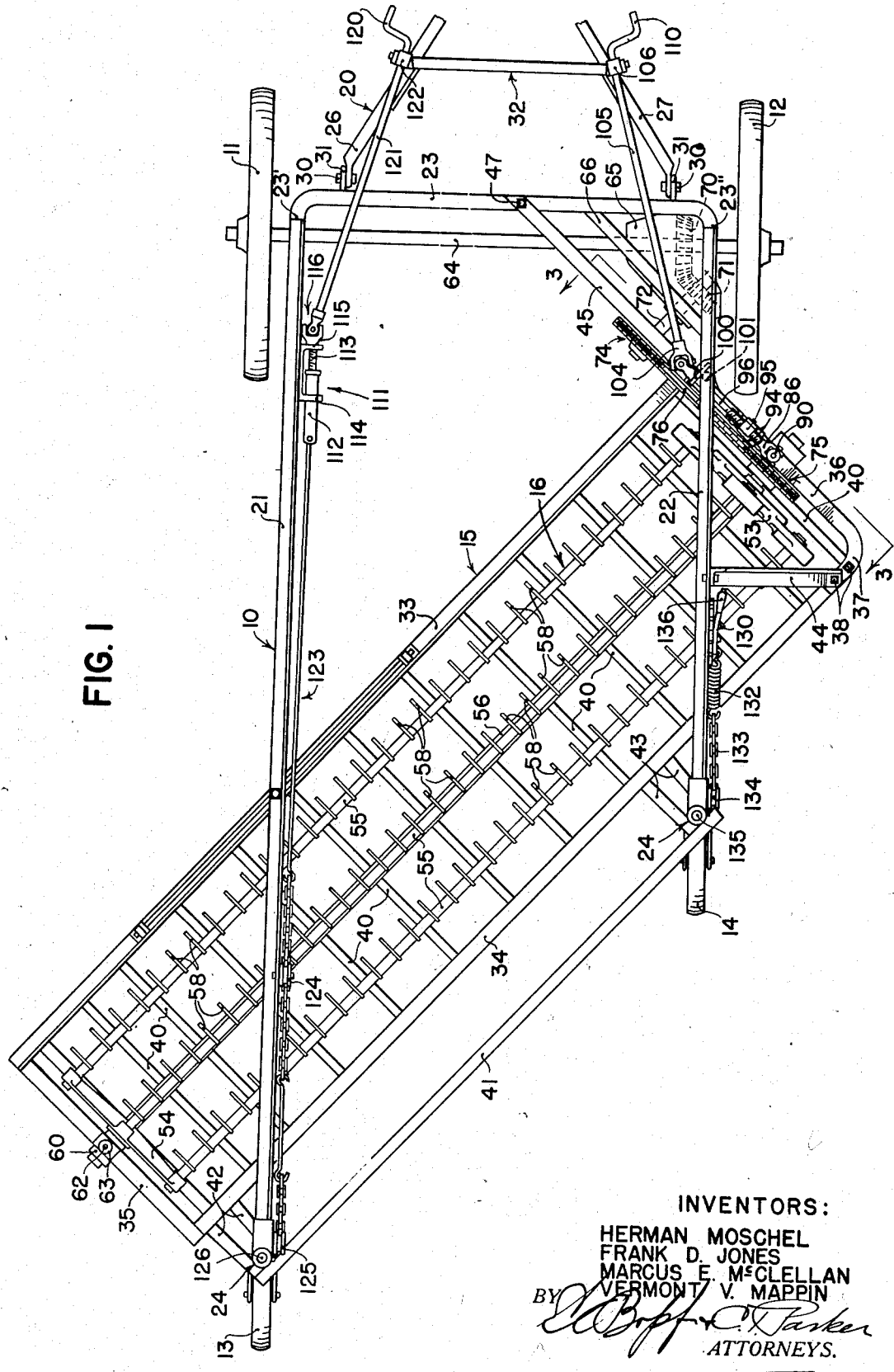
Figure 1 is a top plan view of a side delivery rake constructed according to the principles of our invention.
Figure 2:
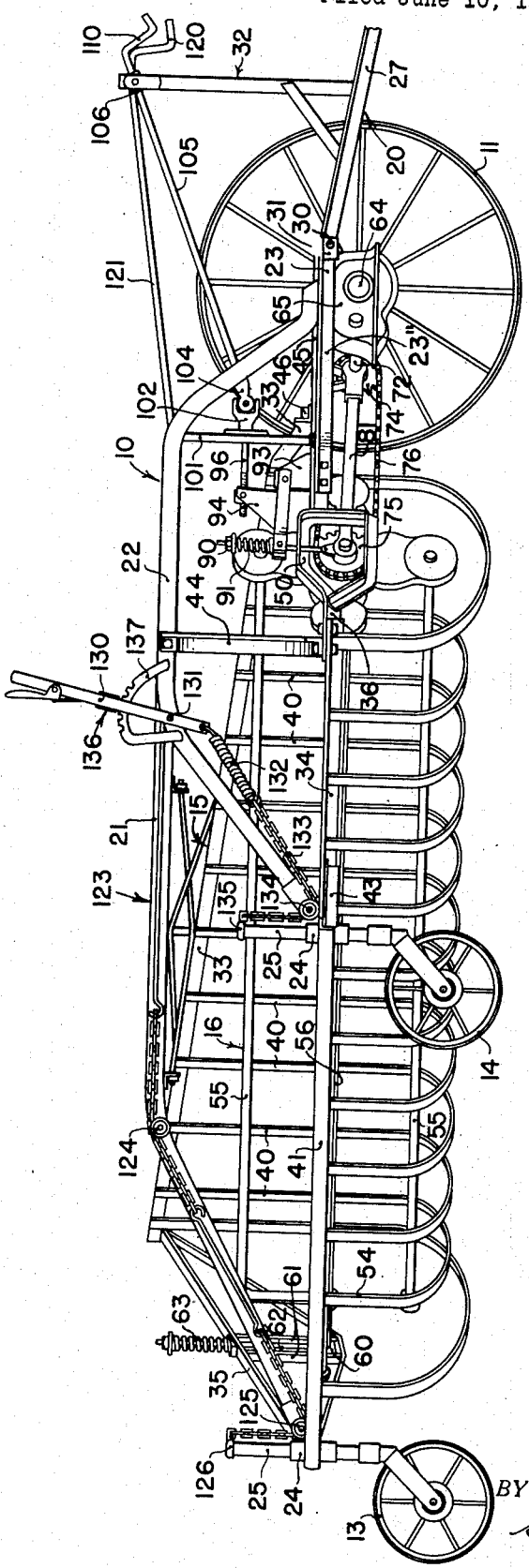
Figure 2 is a side elevation of the same, with the near front wheel removed.

Referring now to the drawings, and more particularly to Figures 1, 2 and 3, the side delivery rake comprises a generally fore and aft extending main frame 10 supported at its front end on a pair of laterally spaced ground wheels 11 and 12, and at its rear end on a pair of obliquely arranged caster wheels 13 and 14 which are disposed substantially in line with their respective front wheels 11, 12. Mounted on the main frame 10 oblique to the line of forward travel is a reel supporting frame 15, on which is journaled the rake reel 16. A draft frame 20 at the front end of the main frame 10 affords means for hitching the rake to a draft vehicle or team, as the case may be.

The main frame 10 is generally U-shaped in plan, and comprises a pair of laterally spaced, longitudinally extending members 21 and 22 of unequal length which are connected together at their front ends by a transversely disposed U-shaped member 23 having rearwardly extending arms 23' and 23''. Each of the members 21, 22 is arched upwardly, as best shown in Figure 2, to provide clearance for the rake reel 16 which is disposed beneath the main frame and projects laterally beyond the members 21, 22. A caster wheel support bracket 24 is fixed to the rear end of each of the members 21, 22, and slidably disposed within the bracket for vertical movement is a standard 25, the lower end of which is forked to receive the caster wheel.

The draft frame 20 comprises a pair of laterally spaced, forwardly converging members 26 and 27 which are pivotally connected at their rear ends by transversely aligned pivot bolts 30 to brackets 31 fixed to the front edge of the transverse frame member 23. The draft frame members 26, 27 are connected together intermediate of their ends by a transversely disposed vertical frame structure 32 which serves also as a support for certain control members which will be described in detail presently. Suitable hitch means (not shown) is provided at the front end of the draft frame 20 for connecting the rake to the drawbar of a tractor.

The reel supporting frame 15 is generally rectangular in plan and consists of front and back members 33, 34 disposed beneath the longitudinal frame members 21, 22, diagonal to the line of forward travel. The outer ends of the members 33, 34 are connected by a cross member 35, while the inner ends are connected together by means including a bar 36 and reel supporting member 45. A plurality of U-shaped strippers 40 are fixed to and extend between the members 33, 34 at regularly spaced intervals to strip the cut vegetation from the teeth on the raking reel 16 as the latter rotates. A frame extension member 41 is disposed parallel to and spaced rearwardly from the back member 34 and is fixed at its ends to the rear ends of the main frame members 21 and 22. The reel frame member 34 and extension member 41 are connected together by brackets 42 and 43. A transversely disposed arched bracing member 44 is fixed to the outside of the right frame member 22 and to the reel frame 15 near the outer corner thereof.

The right end member 36 of the reel supporting frame 15 has a rearwardly extending arm 37 which overlies the front end of the reel frame member 34 and is bolted thereto at 38. The member 36 is arched upwardly at 50 and terminates in a downwardly extending portion 51 to which the rear end of the reel supporting member 45 is welded at 49. A short length of angle iron 52 is welded to the lower end of the downwardly extending portion 51 and to the horizontal portion of the member 36 at 48, forming a loop through which the right end of the rake reel shaft extends. The reel supporting member 45 extends forwardly and laterally inwardly from its point of connection with the member 51 and is bolted at 47 to the transverse frame member 23 between the wheels 11, 12. The inner or front end of the reel frame member 33 overlies the reel supporting member 45 and is secured thereto by a bolt 46, as best shown in Figure 3. Additional support for the right-hand end of the reel frame 15 is provided by the right-hand arm 23'' which is extended rearwardly and is connected to member 45 by bolts 24'.

The raking reel 16 comprises an inner or forward head 53 and an outer or rearward head 54 which are connected together by four tooth-carrying bars 55, and are secured upon a central reel shaft 56. The tooth bars 55 are journaled on the rake heads 53, 54, and are geared to the reel shaft 56 through a set of gears 57 carried by the forward reel head 53, which serve to maintain the rake teeth 58 at the proper angle with respect to the ground as the reel rotates. The reel shaft 56 is journaled at its rear end in a bearing block 60 which is slidable vertically between guides 61 fixed to the underside of the end member 35. The bearing block is connected to the lower end of a vertical rod 62 which extends upwardly through a suitable hole in the member 35 and is supported at its upper end on a compression spring 63. The forward end of the reel shaft 56 is likewise journaled in a yieldingly supported bearing which will be described in detail presently.

Power for driving the reel 16 is derived from the ground wheels 11, 12 which are mounted on a transverse axle 64 outside of the frame members 21, 22 and are connected with the axle to drive the same, the axle 64 being journaled in any suitable bearings fixed to the main frame 10. An enclosed gear housing 65 is mounted on the main frame 10 at the junction of the longitudinal frame member 22 and the transverse member 23 and is also fixed to a diagonal bracing member 66 extending between members 23, 23''. The axle 64 extends through and is journaled in the housing 65, and fixed to the axle within the housing is a bevel gear 70 which is meshed with a companion bevel gear 71. The latter gear is fixed to a short countershaft 72 which is journaled in the housing 65 and projects therefrom, the outer end of the countershaft being journaled in a bearing 73 fixed to the underside of the reel supporting member 45. The countershaft 72 is disposed parallel to the reel shaft 56, and has a driving sprocket 74 fixed to its outer end. A driven sprocket 75 is fixed to the reel shaft 56 in line with the sprocket 74, and trained over the sprockets is a driving chain 76. The outer end of the reel shaft 56 is journaled in a bearing 80 fixed to one end of a radius arm 81, the other end of the arm having a bearing portion 82 which is journaled on the countershaft 72 between the sprocket 74 and gear housing 65.

The reel shaft end of the radius arm is yieldingly supported by spring means comprising a rod 83 which is pivoted in a lug 84 provided on the top of the bearing 80 and extends upwardly therefrom through a hole in the horizontal flange of the arch 50. A trunnion block 85 is pivoted on the outer end of a lifting arm 86 and slidably embraces the rod 83 above the arch 50. A nut 90 is threaded on the upper end of the rod 83, and between the nut and the trunnion block 85 is a compression spring 91 which cushions the weight of the reel on the arm 86. The lifting arm 86 is pivoted at 92 on a triangularly shaped bracket 93 mounted on the top of the reel supporting member 45, and fixed to the arm 86 between the pivot 92 and the trunnion block 85 is an upwardly extending arm 94, the arms 86 and 94 forming a bell crank which is operative to raise or lower the drive end of the rake reel 16. A trunnion block 95 is pivoted on the end of the arm 94, and threaded into the trunnion block is a forwardly extending rod 96, the front end of which is journaled in a plate 100 welded to a vertical post 101 fixed to and extending between members 22 and 23". A universal joint yoke 102 is fixed to the front end of the rod 96 and has a shoulder 103 that bears against the plate 100 in the manner of an end thrust bearing. A second yoke 104 fixed to the rear end of a shaft 105 is operatively connected with the yoke 102 to complete the universal joint, and the shaft 105 extends forwardly therefrom to a point within reach of the operator at his station on the tractor. The front end of the shaft 105 is slidably journaled in a bearing 106 pivoted on the vertical frame 32, and has a crank handle 110 by means of which the operator turns the shaft. From the above, it is seen that the inner or forward end of the rake reel is raised or lowered relative to the main frame for the purpose of leveling the reel with respect to the ground, by turning the crank 110.

The rear end of the main frame 10 is raised or lowered relative to the rear caster wheel 13 for adjusting the rake to the proper height above the ground, and this is accomplished through the agency of an adjusting device 111 mounted on the long frame member 21 near the front end thereof. The adjusting device 111 comprises a nut 112 and screw member 113 in threaded engagement therewith, the nut being held against rotation by a suitable bracket member 114 on the frame member 21, while the screw member is journaled in a bearing bracket 115 and is operatively connected by a universal joint 116 to a hand crank 120 disposed within reach of the operator. The shaft 121 of the crank 120 is journaled within a bearing sleeve 122 through which it is also slidable longitudinally, and the bearing 122 is pivoted on the vertical frame 32. The nut 112 is connected with the vertical standard 25 of the caster wheel 13 through an arrangement of links and chains, indicated generally by the reference numeral 123, which is trained over pulleys 124 and 125 and is attached to a cap 126 fixed to the top of the vertically slidable standard 25. Thus, when the crank 120 is turned in one direction, the standard 25 is pulled downwardly with respect to the main frame 10, thereby raising the rear end of the frame with respect to the ground.

Normally, the rake is supported by the two main wheels 11, 12 and the left-hand, or rearwardmost caster wheel 13, providing a three point ground contact which enables the rake to conform readily to uneven surfaces. The right-hand caster wheel 14 is independently movable vertically and is spring-controlled by means which will now be described, permitting it to follow the surface of the ground and bear its share of the load only as field surface irregularities demand. A lever 130 is pivoted at 131 on the frame member 22 and has a tension spring 132 attached to its lower end, the other end of the spring being fastened to a chain 133 which is trained under a pulley 134 and is attached to a cap 135 fixed to the upper end of the vertically slidable standard 25 of the caster wheel 14. The lever 130 is adjustable to increase or decrease the tension of the spring 132 and is held in adjusted position by means of detent controlled by a latch 136 and engaging a notched sector 137. The front caster wheel 14 thus acts as an adjustable spring-controlled gauge wheel, following the irregularities of the ground surface and helping to boost the rake over mounds or hills.

Another embodiment of our invention is illustrated in Figures 4 to 11, inclusive, which show a tractor-carried or integral rake constructed in accordance with the principles of the invention. Structure of this rake which is similar to that previously described is given the same reference numeral with the suffix a.

The tractor on which the integral rake is mounted includes a transversely disposed differential and rear axle housing 140 having final reduction gear housings 141 mounted on the laterally outer ends thereof. Axles 142 having drive wheels 143 mounted thereon are journaled in the final gear housings 141. The frame of the tractor consists of a pair of laterally spaced, fore and aft extending tubular members 144 and 145 which extend through and project rearwardly from the rear axle housing 140, and mounted on the rear end of each of the tubular members 144, 145 is a platform member 146 preferably in the form of a casting having a curved underside 150 adapted to fit on top of the tube, and a flat top surface 151. Each of the platform members 146 is secured to its respective tubular member by a pair of fore and aft spaced bolts 152 extending through vertically aligned holes in the platform and tubular members. The heads 153 of the bolts are substantially cone-shaped and project upwardly from the top surface 151 of the platform member to facilitate the hitching operation, as will be disclosed in more detail presently.

In Figure 12, which shows a modified form of the coupling device, the casting 146' has integrally formed, tapered aligning lugs 147 projecting upwardly from the top surface 151' thereof. Holes 148 are drilled in the castings 146' and tapped to receive the threaded ends 149 of bolts 152', the heads of the bolts bearing against the bottom of the tubes 144, 145. The lugs 147 serve in the same capacity as the cone-shaped bolt heads 153 shown in Figure 8.

The main frame 10a of the rake comprises two laterally spaced fore and aft extending arched members 21a and 22a which are connected together near their front ends by a cross member 154 fixed to the arched members by means of brackets 155. The cross member 154 projects laterally beyond its point of connection with the frame member 22a and is bolted at 158 to the front end of the reel frame member 33a. The member 154 continues diagonally rearwardly from the bolt 158 to form an extension 200 having a downwardly curved end portion 167 which is welded at 168 (see Figure 11) to the end of member 36a. A diagonal brace 169 is fixed to and extends between the extension 200 and member 36a to provide additional rigidity for the connection therebetween. The front ends of the members 21a, 22a are pivotally connected for vertical swinging at 156 to the arms 157 of a transversely arranged U-shaped draft member 160, the bight portion of which is in the form of a horizontally disposed plate 161 having two pairs of fore and aft spaced holes 162, 163 provided therein. The holes 162, 163 are arranged so as to engage the bolt heads 153 when the draft member 160 is mounted on the tractor, and the plate 161 rests on the flat top surface 151 of the platform members 146. The plate 161 is secured to the platform members 146 by means of two U-bolts 164 each disposed between the holes 162, 163 and extending under the tubular members 144, 145, respectively, and upwardly through laterally spaced holes 165 in the plate. One end 166 of the U-bolt is threaded and has a nut 170 which bears against the top of the plate 161 to draw the U-bolt up tightly against the tubular member and thereby secure a tight hitch connection. The reason for securing only one end of each of the U-bolts 164 with a nut 170 instead of both ends, as is customary, is to facilitate and speed up the operations of coupling or uncoupling the rake from the tractor by reducing to a minimum the number of parts which must be loosened or tightened. An angle member 171 is welded to the plate 161 and projects forwardly and downwardly from the leading edge of the plate to bear against the top of the tubular member, providing an additional point of contact for greater fore and aft stability.

Swingably mounted on the front end of the rake is a jack stand 172 which supports the frame when the latter is disconnected from the tractor. The jack stand 172 is preferably U-shaped and the ends of the arms 174 thereof are disposed between U-shaped brackets 175 fixed to the frame members 21a, 22a, respectively. Each of the arms 174 has a lengthwise-extending slot 176 provided in its end, and the extremity of the arm is rounded at 180 about the outer end of the slot 176 as a center. A pin 181 is fixed to the bracket 175 and extends through the slot 176—the stand 172 being swingable about the pin 181 as a pivot and also slidable relative thereto along the length of the slots. The bracket 175 also functions as a limit stop, engaging the edge of the arm 174 so that when the rake is standing on the jack stand 172 and the weight of the frame causes the pins 181 to drop to the inner ends of the slots 176, as shown in Figure 6, the stop 175 prevents the stand from folding up. The stand 172 is swung up to transport position by moving the same so that the pins 181 occupy positions in the outer ends of the slots 176, whereupon the round ends 180 of the legs will clear the limit stops 175 and allow the stand to be raised to the position illustrated in Figure 7. A hook 182, which is fastened at 183 to the plate 161, engages an apertured lug 184 provided on a cross bar 185 fixed to and extending between the arms 174, to hold the stand in raised transport position.

The front end of the rake frame is raised or lowered with respect to the ground by means of two jacks 186 and 187 which are carried by the stand 172 and are swingable therewith. Each of the jacks comprises a barrel portion 190 disposed between the bight 172' of the U-shaped stand 172 and the cross bar 185 and having radially extending spokes 191. A threaded shaft 192 having a flat base 193 fixed to the outer end thereof, extends through aligned apertures in the bight 172' and cross bar 185 and is in threaded engagement with the barrel portion 190. Friction of the base 193 on the ground prevents the shaft 192 from turning with the barrel portion 190 and thus causes the shaft to be extended or retracted as the operator turns the barrel portion, using the spokes 191 as handles. When the rake is to be unhitched from the tractor, the power driving connection, which will be described presently, is first disconnected, the hook 182 is then disengaged from the lug 184, the stand 172 is swung down to lowered position, and the jack shafts 192 are turned out by hand until their bases 193 rest on the ground. The U-bolt 164 is then removed from the draft member 160 and the jacks 186, 187 are turned to raise the front end of the rake until the plate 161 clears the bolt heads 153, after which the tractor can be driven forwardly, free of the rake.

As in the previously described embodiment, the raking reel 16a is yieldingly supported on the reel frame 15a, and provision is made for adjusting the forward or inner end of the rake vertically with respect to the ground. The bearing end 80a of the radius arm 81a is supported on a rod 83a and spring 91a, and the latter bears against a trunnion block 85a pivoted between the outer ends of a forked arm 194. The arm 194 is pivotally connected at 195 to an upright support 196 fixed to the rearwardly bent end portion 200 of the cross bar 154. A lever 201 is fixed to the arm 194 for raising or lowering the latter, and is held in adjusted position by means of a detent 202 engageable with notches 203 in the top edge of the support 196.

Power for driving the rake reel 16a is derived from the rear axle of the tractor and is transmitted by means including a drive sprocket 204 which is bolted at 205 to the inner face of the right-hand drive wheel 143. A driven sprocket 206 is journaled on an intermediate drive or power shaft 210 in line with the sprocket 204 and is operatively connected therewith through the agency of a clutch 209 which will be described in more detail presently. A drive chain 211 is trained over the sprockets 204 and 206 and is held tightly against the same by means of a chain tightener sprocket 207 journaled on an arm 208 which is pivoted at 217 on the frame member 22a and is yieldingly held against the chain by a spring 218 which is anchored to a bracket 219 provided on a gear housing 212. The power shaft 210 is disposed adjacent the front end of the main frame 10a and transverse to the line of forward travel, and the outer end of the shaft extends through and is journaled in the gear housing 212 which is fixed to the extension 200 of cross member 154 by means of a bracket 213 and to the end of the reel frame member 33a by means of a bolt 214 and spacer 215. A diagonally disposed countershaft 216 is journaled in the gear housing 212 and projects laterally therefrom toward the centerline of the rake parallel to the axis of the central reel shaft 56a. Intermeshing beveled gears 220 and 221 are fixed to the shafts 210 and 216, respectively, to provide driving connection therebetween. A sprocket 74a is fixed to the end of the countershaft 216 in line with the sprocket 75a on the reel shaft 56a and is connected therewith through the agency of a drive chain 76a. The inner or forward end of the radius rod 81a is journaled for vertical swinging on the countershaft 216 between the sprocket 74a and the gear housing 212.

The clutch 209 provides means for interrupting the transmission of power to the reel 16a when the rake is being transported, and comprises a driving member 222 fixed to the side of the sprocket 206 opposite the gear housing and a spring biased driven member 223 movable axially along the shaft 210 into and out of engagement with the driving member. The driven clutch member 223 is slidably keyed to the shaft 210 in driving connection therewith and is yieldingly held in engagement with the driving member 222 by means of a spring 224 which abuts against a cap 225 pinned to the end of the shaft 210. The clutch is disengaged or released through the agency of a shifting fork 226 journaled for vertical swinging between raised and lowered positions on one end of a transversely disposed shaft 230 which is slidably supported on two brackets 231, 232 fixed to the under side of the cross bar 154. The shifting fork 226 has a U-shaped portion 233 adapted to lie within an annular groove 234 provided in the driven member 223 and is swingable out of engagement therewith to the raised position shown in Figure 10. The shifting fork is held on the shaft 230 by a split cotter pin 235, and the shaft is made to move axially, carrying the shifting fork and clutch member with it, by means of a lever 236 pivoted at 240 to the shaft outside of the bracket member 232. The lever 236 has a rearwardly projecting extension 241 (see Figure 4) which bears against the bracket 232 when the lever is swung and cams the shaft 230 in the direction for disengaging the clutch.

The shifting fork 226 is provided at its outer end with a finger grip 242 by which the fork can be swung from engaged or lowered position to raised or inoperative position, and is held in either position by means of an over-center spring connection comprising a curved link 243 and spring 244. The link is pivotally connected with the shifting fork at 245 and is fastened at the other end to the spring 244 which is anchored at 246 to the end stripper 40a. When the shifting fork is engaged in the groove 234 of the driven clutch member, as in Figure 9, the line of pull between the points 245, 246 passes below the axis of the shaft 230, and the shifting fork is held down in the groove. When the fork is raised to the position shown in Figure 10, however, the line of pull passes above the axis of the shaft 230, by virtue of the curved link 243, and the fork is now held in raised position, allowing the operator to use both hands while removing the drive chain 211 endwise over the clutch 209.

When the rake is to be unhitched from the tractor, the driving chain 211 is removed from the sprocket 206 and withdrawn over the end of the clutch 209, with the shifting fork 226 raised to the position shown in Figure 10 to provide clearance. The chain is then looped over the final reduction housing 141 of the tractor and supported on bracket hooks 250 and 251 (see Figure 6) fixed to the housing, said hooks being passed through the links of the chain to hold the same securely in place, as shown in Figure 7. In this way it is unnecessary to disconnect the links of the chain when the rake is temporarily unhitched from the tractor.

The rear end of the main frame 10a is raised or lowered relative to the rear caster wheel 13a through the agency of an adjusting device 252 mounted on the longitudinal frame member 21a near the front end thereof. The adjusting device 252 comprises a worm 253 fixed to a fore and aft extending shaft 254 which is journaled on a bracket 255 and has a handle 256 at the front end thereof disposed within reach of the operator. The worm 253 engages a worm gear 260 fixed on a transverse shaft 261 which is journaled between a plate 262 and the frame member 21a. A reel 263 (Figure 4) is fixed to the shaft 261 and has a flexible cable 264 attached thereto, the other end of the cable being fastened to the chain and link connection 123a. When the handle 256 is turned, the reel 263 winds up the cable 264, exerting a downward pull on the caster wheel standard and thereby raising the main frame 10a. The lead of the worm 253 is such that the worm is irreversible, hence it is unnecessary to provide detent means for holding the adjusting device in the selected position.

The forward, or right hand caster wheel 14a is yieldingly urged downwardly by means comprising a spring 265 which is anchored to a bracket 266 on the frame member 22a and is attached to one end of a chain 270. The other end of the chain 270 is trained over and is fixed to a cam pulley 271 (Figure 5) mounted on a transversely disposed shaft 272 which is journaled on the rear end of the frame member 22a. A round pulley 273 is fixed to the shaft 272 alongside the cam pulley 271, and a second chain 274 is fixed to and trained around the same, the chain 274 being fastened to the cap 135a at the upper end of the standard 25a. The cam pulley 271 is so shaped and so positioned on the shaft 272 that the pull exerted by the spring 265 on the standard 25a is substantially uniform throughout the range of movement of the standard. This is accomplished by varying the distance from the shaft 272 to the line of pull of the chain 270 so that when the spring 265 is stretched beyond normal, as when the standard 25a is suddenly thrust upwardly by passage of the caster wheel over a hill, the increased tension in the spring is compensated for by a shorter moment arm, and the transmitted force remains practically the same.

It is believed that the advantageous features of our improved side delivery rake will be readily apparent to those skilled in the art from the above description, and what we claim and desire to secure by Letters Patent is:

1. A side delivery rake comprising a frame including a pair of longitudinally disposed laterally spaced frame members connected together at their forward ends by a transverse frame member, supporting means for the forward end thereof including a pair of wheels disposed on opposite sides of said frame, a reel supporting member fixed to said frame substantially midway between said wheels and extending diagonally rearwardly to a point directly behind one of the wheels, a rotatable reel disposed obliquely behind said wheels and extending beyond the planes of the latter at opposite ends, respectively, the forward end of said reel being carried on said member in a position behind said one wheel in which the reel rakes the ground directly behind the wheel and extending underneath both of said frame members and supported thereon, and wheels mounted on the rear ends of said frame members, respectively, behind said reel.

2. A side delivery rake comprising a frame including a pair of longitudinally disposed laterally spaced frame members connected together at their forward ends by a transverse frame member, a pair of supporting wheels journaled at opposite sides of said frame, a rotatable reel supported by said frame obliquely of said frame and extending beyond the planes of said wheels at opposite ends, respectively, said longitudinal frame members extending over said reel, and a supporting wheel connected to each of said members at their rear ends.

3. A side delivery rake comprising a rigid frame which is generally U-shaped in plan, the two legs of the frame being of unequal length and extending rearwardly, a supporting wheel on the rear end of each leg of the frame, a pair of supporting wheels disposed on opposite sides of the frame at the forward end thereof, a reel supporting member fixed to said frame between said front wheels and extending rearwardly and laterally behind one of said wheels, a rotatable reel supported at its forward end on said supporting member and extending from a point outside of the plane of said one wheel underneath both of said legs, and a support for said reel on each of said legs.

4. A side delivery rake comprising a rigid frame including a pair of longitudinally disposed, laterally spaced, arched frame members, a supporting wheel mounted at the rear end of each of said members, and a transverse frame member connected between the forward ends thereof, a live axle journaled transversely across the forward end of said frame, a pair of wheels operatively connected at opposite ends of said axle outside said frame to drive said axle, a reel support member fixed to said frame and extending laterally under one of said arched members, and a reel carried on said reel support under said arched members and extending beyond each of the latter on opposite sides of the frame and means connecting said axle to said reel to drive the latter.

5. A side delivery rake comprising a rigid frame including a pair of longitudinally disposed, laterally spaced, arched frame members, a supporting wheel mounted at the rear end of each of said members, a transversely disposed axle journaled on said frame, a pair of laterally spaced ground wheels mounted on said axle outside said frame and connected to said axle to drive the same, a reel supporting member attached to the frame substantially midway between said wheels and extending rearwardly and laterally behind one of the wheels and beyond the plane of the latter, a reel rotatably carried thereon and extending laterally beyond said one wheel and obliquely rearwardly beneath both of said arched members and supported therefrom, power transmitting means fixed to said axle inside said frame, and a drive chain extending diagonally rearwardly from said power transmitting means and operatively connected with said reel for driving the latter.

6. A side delivery rake comprising a rigid frame including a pair of longitudinally disposed laterally spaced, arched frame members, a supporting wheel mounted at the rear end of each of said members, a transversely disposed axle journaled on said frame, a pair of laterally spaced ground wheels mounted on said axle outside said frame and connected to said axle to drive the same, a reel supporting member attached to the frame and extending rearwardly and laterally behind one of said wheels and beyond the plane of the latter, a reel rotatably carried thereon and extending laterally beyond said one wheel and obliquely rearwardly beneath both of said arched members and supported therefrom, said reel being rotatable about an axis substantially perpendicular to said reel supporting member and movable vertically relative thereto, a bevel gear fixed to said axle between said wheels, a countershaft mounted on said frame parallel to the axis of rotation of the reel and having a bevel gear in mesh with the gear on the axle, a sprocket fixed on said countershaft, a sprocket fixed on said reel, and a flexible chain interconnecting said sprockets for driving the reel, said chain being substantially parallel to said reel supporting member.

7. A side delivery rake comprising a frame supported at its forward end on ground engaging wheel means, a pair of laterally spaced caster wheels disposed at the rear of said frame and movable vertically relative thereto, means for adjustably fixing the position of one of said wheels, and spring means for yieldably urging the other of said wheels downwardly relative to the frame.

8. A side delivery rake comprising a frame including a pair of longitudinally disposed laterally spaced frame members connected together at their forward ends by a transverse frame member, a pair of supporting wheels journaled at opposite sides of said frame, a rotatable reel supported by said frame, said frame members extending over said reel, and a pair of supporting wheels connected to the rear ends of said members, respectively, by means providing for vertical movement of said wheels relative to said members, means for adjustably fixing the position of one of said wheels, and spring means for urging the other of said wheels downwardly relative to said frame.

9. A side delivery rake comprising a rigid frame supported at its forward end on ground engaging wheel means, a pair of laterally spaced wheels connected to the rear of said frame by means providing for movement vertically relative to said frame, means for adjustably fixing the position of one of said wheels, spring means for yieldably urging the other of said wheels downwardly relative to said frame, and means for adjusting the tension of said spring means.

10. A side delivery rake comprising a frame, a rotatable shaft journaled thereon, a radius arm having one end journaled on said shaft, a rake reel journaled on the other end of said radius arm, driving connection between said shaft and said reel, and spring means for yieldingly supporting said other end of the radius arm.

11. A side delivery rake comprising a frame, a transverse axle journaled thereon, a pair of laterally spaced ground wheels mounted on said axle and connected therewith to drive the same, a countershaft journaled on said frame adjacent the axle and diagonal to the line of forward travel, a pair of intermeshing bevel gears mounted on said axle and said countershaft, respectively, a radius arm journaled on the countershaft for vertical swinging movement relative to said frame, a sprocket wheel fixed to the countershaft, a rake reel journaled on the free end of the radius arm for rotation about an axis parallel to the axis of the countershaft, means supporting said reel on said frame providing for vertical movement relative thereto, a sprocket wheel fixed to the rake reel, and a driving chain trained over said sprocket wheels.

12. A side delivery rake comprising a frame, a reel shaft journaled in bearing means for rotation about an axis diagonal to the line of forward travel, means supporting said reel shaft on said frame providing for vertical movement relative thereto, a transversely disposed main drive shaft, a countershaft journaled on said frame parallel to the axis of the reel shaft, intermeshing driving and driven gears fixed to said drive shaft and said countershaft, respectively, a sprocket wheel mounted on the countershaft and spaced axially from said driven gear, a radius arm having one end journaled on said countershaft and the other end journaled on the reel shaft, a sprocket wheel fixed to the rake reel, and a driving chain trained over said sprocket wheels.

13. A side delivery rake comprising a generally U-shaped main frame having a generally transversely disposed bight portion and a pair of laterally spaced legs extending rearwardly therefrom, a ground wheel journaled on the rear end of each of said legs, and a reel supporting frame extending under both legs of said main frame at an angle to the line of forward travel, means for supporting one end of said reel supporting frame on one of the legs of said main frame and means for supporting the other end of said reel on the other leg.

14. A side delivery rake comprising a pair of laterally spaced fore and aft extending main frame members, wheel means supporting the front ends of said members, a caster wheel supporting the rear end of each of said members, a reel supporting frame mounted on said members oblique to the line of advance, and a rake reel journaled on said supporting frame, said reel projecting laterally outwardly of both of said main frame members.

15. A side delivery rake comprising a pair of laterally spaced, fore and aft extending arched frame members connected together at their front ends by a transverse member, a reel supporting member fixed to said transverse member near the midpoint thereof and extending diagonally rearwardly beneath one of said arched members, a reel frame disposed oblique to the line of advance and extending under said arched members, the forward end of said reel frame being fixed to said reel support member and the rear end of the reel frame being fixed to one of the arched frame members, and a bracing member fixed to the other arched frame member and to the forward end of the reel frame.

16. A side delivery rake comprising a pair of laterally spaced, fore and aft extending arched frame members connected together at their front ends by a transverse member, wheel means supporting the front ends of said arched members and a caster wheel journaled on the rear end of each of the arched members, a reel supporting frame disposed oblique to the line of forward travel and extending beneath said arched members, a reel carried in said reel supporting frame and extending laterally outwardly from both of said arched members, the front end of said reel supporting frame being fixed to said transverse member, means connecting one of said arched members to the rear end of the reel supporting frame, and means connecting the rear end of the other arched member to said reel supporting frame intermediate the ends thereof.

17. A side delivery rake comprising a U-shaped main frame having legs of unequal length, an obliquely disposed bracing member connecting the rear ends of said legs, supporting wheels journaled on the rear ends of the legs, a reel supporting frame disposed parallel to said oblique bracing member and rigidly connected therewith, and means connecting the front end of the reel supporting frame to the bight portion of the U-shaped main frame.

18. In combination with a tractor having an engine driven sprocket, a side delivery rake comprising a generally fore and aft extending frame, wheel means for supporting the rear end of the frame, detachable coupling means for hitching the front end of the frame to the tractor, a rake reel journaled on the frame, a second sprocket journaled on said frame in line with the sprocket on the tractor and connected with said reel to drive the same, a drive chain trained over said sprockets, said chain being removable over one end of said second sprocket, and bracket means fixed to the tractor adjacent said first mentioned sprocket for holding the chain when disconnected from the second sprocket.

19. In combination with a tractor having a rear axle housing, a pair of laterally spaced drive wheels, and a sprocket fixed to the inner side of one of the wheels, a side delivery rake comprising a frame, means for coupling said frame to the tractor, a rake reel journaled on the frame, a second sprocket journaled on the frame in line with said first mentioned sprocket and connected with said reel to drive the same, a drive chain trained over said sprockets, said chain being removable over one end of said second sprocket, and a bracket hook fixed to the axle housing and adapted to pass through the links of said chain when the latter is disconnected.

20. A side delivery rake comprising a frame, a rake reel journaled thereon, a sprocket journaled on the frame, a chain trained over said sprocket, and a releasable clutch connecting said sprocket with said reel, said clutch comprising a pair of interengageable members, one of said members being connected with said sprocket and the other member being movable axially into and out of engagement with said one member, and a clutch actuating member engageable with said other clutch member for moving the same axially, said actuating member being movable away from said other clutch member to permit removal of the chain from the sprocket over the clutch.

21. A side delivery rake comprising a frame, a rake reel journaled thereon, a sprocket journaled on the frame, a chain trained over said sprocket, and a releasable clutch connecting said sprocket with said reel, said clutch comprising a pair of interengageable members, one of said members being connected with said sprocket and the other member being movable axially relative thereto between engaged and disengaged positions, said other clutch member having an annular groove provided therein, a clutch actuating member slidably disposed within the groove and operative to move the clutch member axially, said clutch actuating member being swingable out of engagement with said other clutch member to provide clearance for the removal of said chain over said clutch.

22. A side delivery rake comprising a frame, a rake reel journaled thereon, a rotatable power shaft connected with said rake reel to drive the same, a sprocket journaled on said power shaft, a drive chain trained over the sprocket, a clutch disposed on one side of said sprocket for connecting the same with said drive shaft, said clutch comprising a pair of interengageable members, one of said members being fixed to the sprocket and the other member being slidable axially along said shaft into and out of engagement with said one member, said other clutch member having an annular groove formed therein, a shift rod disposed parallel to said power shaft and supported on the frame for axial sliding movement, a clutch actuating member carried on said rod and movable axially therewith, said actuating member having a portion thereof adapted to lie within the groove in said other clutch member, and said actuating member being swingable about the axis of said rod out of engagement with said other clutch member to provide clearance for the removal of said drive chain over said clutch.

23. A side delivery rake comprising a frame, a rake reel journaled thereon, a rotatable power shaft connected with said rake reel to drive the same, a sprocket journaled on said power shaft, a drive chain trained over the sprocket, a clutch disposed on one side of said sprocket for connecting the same with said drive shaft, said clutch comprising a pair of interengageable members, one of said members being fixed to the sprocket and the other member being slidable axially along said shaft into and out of engagement with said one member, said other clutch member having an annular groove formed therein, a shift rod disposed parallel to said power shaft and supported on the frame for axial sliding movement, a lever arm pivoted on said rod and engageable with the frame to move the rod axially, a clutch actuating member having a U-shaped portion adapted to lie within said groove, said actuating member being journaled on said rod for swinging movement into and out of engagement with said other clutch member and movable axially with the rod, and an over-center spring connection between the actuating member and the frame operative to exert a force on the actuating member tending either to hold the same down into engagement with the clutch or up out of engagement therewith, as the case may be.

24. A side delivery rake comprising a main frame, means for supporting the front end of said frame including a pair of laterally spaced wheels, a pair of rear wheels for supporting the rear end of the frame, said rear wheels being disposed to run substantially in the track of the front wheels, a reel-carrying frame mounted on said main frame ahead of said rear wheels diagonal to the line of forward travel, and a rake reel journaled on said reel carrying frame, the ends of said reel projecting laterally outwardly beyond the track of said wheels whereby the rake is able to rake the ground directly behind said front wheels.

25. A side delivery rake comprising a pair of laterally spaced, fore and aft extending main frame members connected together at their front ends by a transverse member, means for supporting the front end of said main frame including a pair of laterally spaced front wheels, a pair of laterally spaced rear wheels mounted at the rear ends of said fore and aft members substantially in line with said front wheels, a reel supporting frame mounted on said main frame members oblique to the line of advance, the ends of said reel supporting frame extending laterally outwardly beyond both of said fore and aft frame members, a rake reel journaled on said reel supporting frame, the ends of said reel being disposed to rake directly behind said front wheels respectively.

HERMAN MOSCHEL.
FRANK D. JONES.
VERMONT V. MAPPIN.
MARCUS E. McCLELLAN.